Nov. 7, 1967  D. R. STONELY  3,350,820

HIGH-LINE TRANSFER SYSTEMS

Filed March 2, 1965  8 Sheets-Sheet 1

Inventor
Donald Robert Stonely
By Cushman, Darby & Cushman
Attorneys

FIG. 2.

Nov. 7, 1967 — D. R. STONELY — 3,350,820
HIGH-LINE TRANSFER SYSTEMS
Filed March 2, 1965 — 8 Sheets-Sheet 5

Inventor
Donald Robert Stonely
By Cushman, Darby & Cushman
Attorneys

Nov. 7, 1967 D. R. STONELY 3,350,820
HIGH-LINE TRANSFER SYSTEMS
Filed March 2, 1965 8 Sheets-Sheet 6

Inventor
Donald Robert Stonely
By Cushman, Darby & Cushman
Attorneys

FIG.12.

United States Patent Office 3,350,820
Patented Nov. 7, 1967

3,350,820
HIGH-LINE TRANSFER SYSTEMS
Donald R. Stonely, Chateauguay, Quebec, Canada, assignor to Peacock Brothers Limited, Montreal, Quebec, Canada
Filed Mar. 2, 1965, Ser. No. 436,472
Claims priority, application Great Britain, May 15, 1964, 20,470
10 Claims. (Cl. 52—29)

ABSTRACT OF THE DISCLOSURE

An apparatus for transferring material from one ship to another which comprises a retractable post unit adapted to carry a transfer line on which the material is transferred, and wherein the post unit is storable beneath the deck of the ship by means of retracting mechanism associated therewith.

This invention relates to high-line transfer systems and particularly, but not exclusively, to high-line transfer systems suitable for use in transferring supplies or armament between two vessels under way at sea.

The transfer of loads between two vessels at sea may be a difficult and dangerous operation as a result of the fact that it requires the vessels to be close together. Transfer of loads should therefore be completed as quickly as possible. It is also important to maintain accurate control of the loads being transferred to prevent hazardous swinging movements thereof.

It is an object of the present invention to provide means which can be used to minimize or reduce the time taken by a transfer operation and to assist in maintaining control of the loads being transferred.

A high-line transfer system comprises essentially two upright posts or masts and a cable extending between the tops of the posts for transfer of loads therebetween. The present invention provides a post for such a system, which post has a cable attachment member mounted for vertical reciprocation thereon and means for adjusting the vertical position of the attachment member on the post. Thus, while transfer of loads from one post to another can be effected with the attachment members at the tops of the posts so that the cable is elevated, when it is required to attach the loads to the cable or remove them from the cable the attachment members can be lowered to the bottoms of the posts so that attachment or removal of the loads is done at deck or ground level.

The means for adjusting the vertical position of the attachment member preferably comprises a motor connected to the attachment member through a suitable drive system. In a preferred drive system for adjusting the attachment member, the motor drives a vertical screw on which a nut is non-rotatably mounted inside the post and flexible connectors (e.g. chains or cables) are arranged to be fixed to the attachment member and extend respectively upwards and downwards therefrom to pass around wheels carried by the post and by the nut to anchorages inside the post, whereby the nut is vertically reciprocable by rotating the screw in opposite directions and vertical movement of the nut imparts vertical movement in the opposite direction to the attachment member through the flexible connectors.

When the post is not in use, its presence may create an undesirable obstruction. It is therefore a feature of the invention that means may be provided for retracting at least a substantial length of the post below deck or ground level. Preferably, the aforesaid attachment member, after lowering to deck or ground level, is secured to the deck or ground and acts as a guide through which the post is retracted downwards.

The same motor may be used to raise and lower the attachment member on the post and to retract and extend the post itself. In a preferred arrangement, employing a drive system as described above, the motor is carried at the bottom of the post and the aforesaid flexible connectors can be disconnected from the attachment member and connected to a supporting cable or like member which passes downwardly into a well for receiving the retracted post and then round a supporting wheel carried at the bottom of the post (e.g. on the motor casing) and finally up to a fixed anchorage, e.g. at deck level. The weight of the post and motor can therefore be supported by the cable or like member, and operation of the motor causes retraction or extension of the post according to the direction of rotation of the aforesaid screw. Means will of course be provided for locking the post in its extended position, which locking means are releasable when it is desired to retract the post.

Preferably, the post is mounted so that it can rotate on a vertical axis when extended so as to allow for changes in the relative positions of two vessels between which loads are being transferred. Additionally, provision may be made to permit limited angular displacement of the post from the vertical under the forces imposed on it by the high-line.

The following is a description, by way of example, of one embodiment of the invention for use on a ship, reference being made to the accompanying drawings, in which.

Referring to the drawings, a hollow king post 10 of rectangular cross-section is embraced by a cable attachment member 11 (hereinafter referred to as a pad eye) mounted thereon so as to be slidable up and down. The pad eye 11 is in effect an eye plate to which a buffer assembly with sheaves and other parts can be attached. Rollers 12 carried by the pad eye bear against opposite faces of the king post 10.

The king post 10 has a base 17 which is mounted through a self-aligning thrust bearing 13 and a self-aligning journal bearing 14, having a common alignment centre, on a casting 15. To prevent upwards displacement of the base 17 from the casting 15, a spherical bearing member 17a centered on said alignment centre and carried by the base 17 engages beneath a downwardly directed concave face of complementary shape on the casting 15. Underneath the casting is fixed a reversible electric driving motor 16. Means for supporting the casting at deck level are described hereinafter.

The motor 16 drives a screw 18 mounted inside the king post on the vertical axis thereof. The drive to the screw, which passes up through bores in the casting 15 and base 17, comprises a pinion 16a which is mounted on the motor shaft 16b and mates with the periphery of a driven gear 19 splined to a shaft 19a supported so that the axis of the shaft coincides with the axis of the king post in two ball bearings 19b in a housing 19c fixed between the casting 15 and the casing of the motor. The shaft 16b terminates in a flexible coupling 20 which is preferably of the Waldron-Franke type located in a manner to provide 1/8" clearance between coupling faces, the clearance being equally disposed about the common alignment centre of the self-aligning thrust and journal bearings 13, 14. Thus, any swaying movement of the king post permitted by the stay wires hereinafter described can cause only slight angular misalignment of the coupling faces, for which condition this type of coupling is designed. The coupling 20 drives a shaft 20a mounted in a ball bearing 20b and a taper roller bearing 20c (arranged to resist downward thrust of the shaft 20a) in the base 17. The shaft 20a terminates in a controllable slip friction coupling or clutch 21 preferably of the serrated metal-to-metal face type. The whole bearing and gear assembly above referred to is rendered oil and grease tight by the provision of suitable seals. The slipping clutch 21 drives a stub shaft 21a supported in ball bearings 21b, which stub shaft carries a compression spring 21c, adjusting nut 21d and the sliding element 21e of the slipping clutch, this element being splined to the stub shaft and slidable thereon. The upper end of the stub shaft 21a terminates in an internally toothed gear type concentric coupling 58 which transmits the drive to a mating quill shaft 59 having a radiused end 59a engaging a hardened button 59b inserted in the end of the stub shaft 21a so as to locate the quill shaft axially relative to the stub shaft. The upper end of the quill shaft 59 is connected to a driven shaft 60 by a second internally toothed concentric gear type integral coupling 59a which provides axial clearance between the quill shaft 59 and the driven shaft 60 permitting relative axial displacement thereof. The driven shaft 60 is rigidly connected by a coupling 61 to the screw 18 which is supported by journal and thrust bearings in such a manner that the screw 18 is always maintained in tension under the load of a nut 22 mounted thereon. The above-described arrangement of shafts and couplings has as an object to protect the drive against being influenced by deflections of the king post induced by the tension of the high line.

The nut 22 is held nonrotatably relative to the screw in a mounting 23. The screw and nut assembly is of the ball-screw type which comprises essentially a threaded shaft on which the "screw thread" provides a helical track for a number of bearing balls which are housed in the nut. Under load, these balls roll and recirculate in the same manner as in an ordinary ball bearing. Rotation of the screw 18 causes the nut 22 and the mounting 23 to move up or down according to the direction of rotation.

The mounting 23 carries two pairs of sprockets 24 and 25. Pairs of parallel roller-chains (indicated in the drawings by the lines 26 and 27) pass round the sprockets 24 and 25 respectively. The parallel chains 26 pass up from one side of the sprockets 24 to an anchorage 28 inside the king post and pass up from the other side of the sprockets 24 to run round sprockets 29 mounted in the side wall of the king post at the top thereof. From the sprockets 29 the chains 26 run down outside the king post to a carrier 31 to which they are fastened. Similarly, the chains 27 pass down from one side of the sprockets 25 to an anchorage 32 inside the king post and pass down from the other side of the sprockets 25 to run round sprockets 33 mounted in the side wall of the king post at the bottom thereof. From the sprockets 33, the chains 27 run up outside the king post and are fastened to the carrier 31. As a result of this arrangement, vertical movement of the mounting 23 causes vertical movement of the carrier 31 in the opposite direction, i.e. when the mounting moves up the carrier moves down and vice versa. The arrangement is such that movement of the mounting 23 through a given distance causes movement of the carrier 31 for twice that distance.

It will therefore be seen that operation of the motor causes the carrier 31 to move up or down according to the direction of rotation of the motor. The pad eye 11 is connected to the carrier 31 by a suitable quick-release device, e.g. pins 34, so as to move up and down with it. Thus the pad eye can be moved between deck level and the top of the king post.

Above the screw 18, a continuation shaft 35 terminates at a bevel gear 36 which can be engaged by a pinion on a handle insertable into the king post through an opening 37 for manual operation of the screw in emergencies. A similar gear 38 and access opening 39 are provided at the lower part of the drive.

When the king post is in its extended position, its top is supported by a self-aligning cap fitting 40 to which four pre-stressed stay wires 41 are attached. The provision of self-aligning mountings at both top and bottom of the king post results in deflections of the post under high-line tension being of a simple nature and thus stresses are minimized.

The aforesaid casting 15 at the lower end of the king post has a male breech-type interrupted thread 42 machined around its outside. When the king post is extended, this thread engages with a female breech-type interrupted thread 43 in a nut member 44. The nut 44 is rotatably mounted, by using bearing balls 45 to reduce friction, in a flanged deck fitting 46 which is welded or bolted to the deck. Suitable means, e.g. "tommy" holes or a gear train driven by a winding handle, are provided for rotating the nut in the deck fitting so as to disengage the female threads from the male threads on the casting 15 so that the king post can be lowered into a well or storage trunk below deck level.

The means for lowering the king post comprises a loop of wire rope 47 which, when the king post is extended, hangs freely down in the storage trunk except that it is held by retainers 48 against opposite sides of a grooved pulley 49 mounted on the casting of the motor 16. One end of the wire rope 47 is securely attached by an anchorage 50 to the underside of the deck fitting 46, while the other end carries a connecting member or fitting 51 which is disposed in a passage 52 in the casting 15 so as to be accessible from the deck, whereby the connecting member 51 can when desired be gripped and raised upwards to draw the wire rope up through the passage 52.

Figure 1:
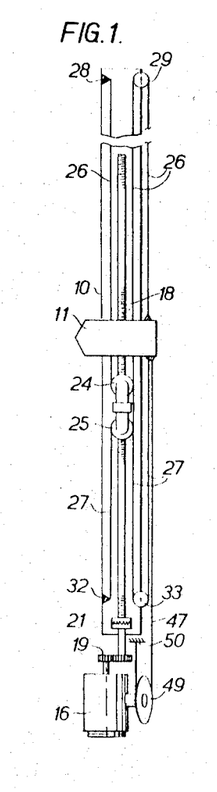
FIGURE 1 is a diagrammatic sectional elevation of a post unit.
Figure 1A:
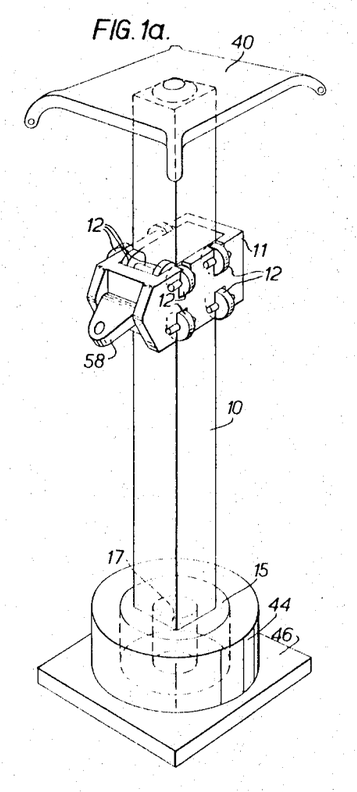
FIGURE 1a is a diagrammatic perspective view of the post unit.
Figure 2:
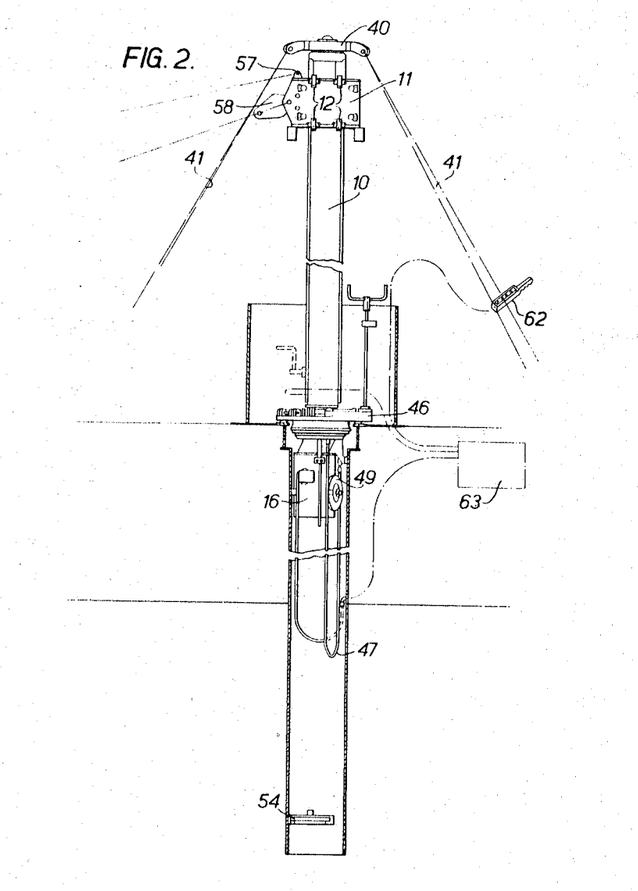
FIGURE 2 is a side view of the post unit with the post in its extended position.
Figures 3, 4:
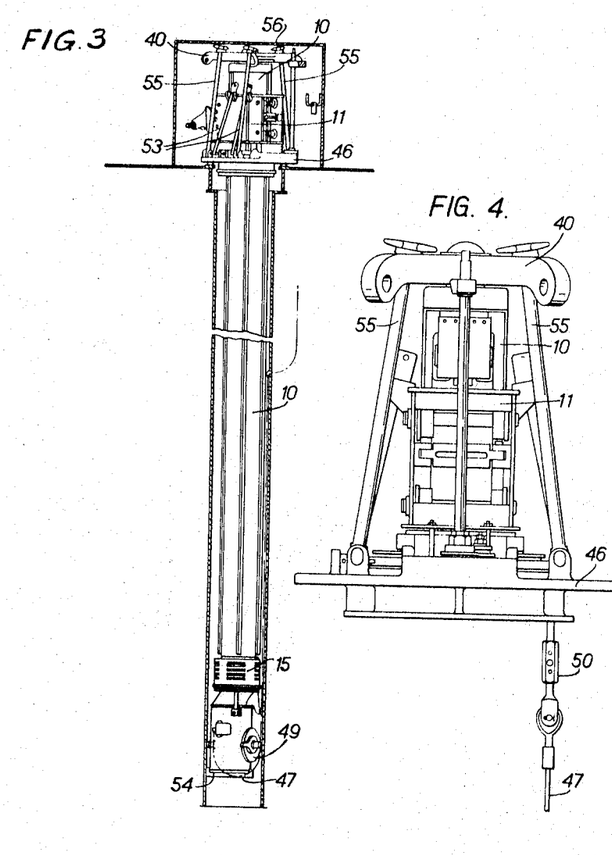
FIGURE 3 is a side view of the post unit with the post in its retracted position.
FIGURE 4 is a side view on a larger scale of the upper part of the post unit when the post is in its retracted position.
Figure 5:
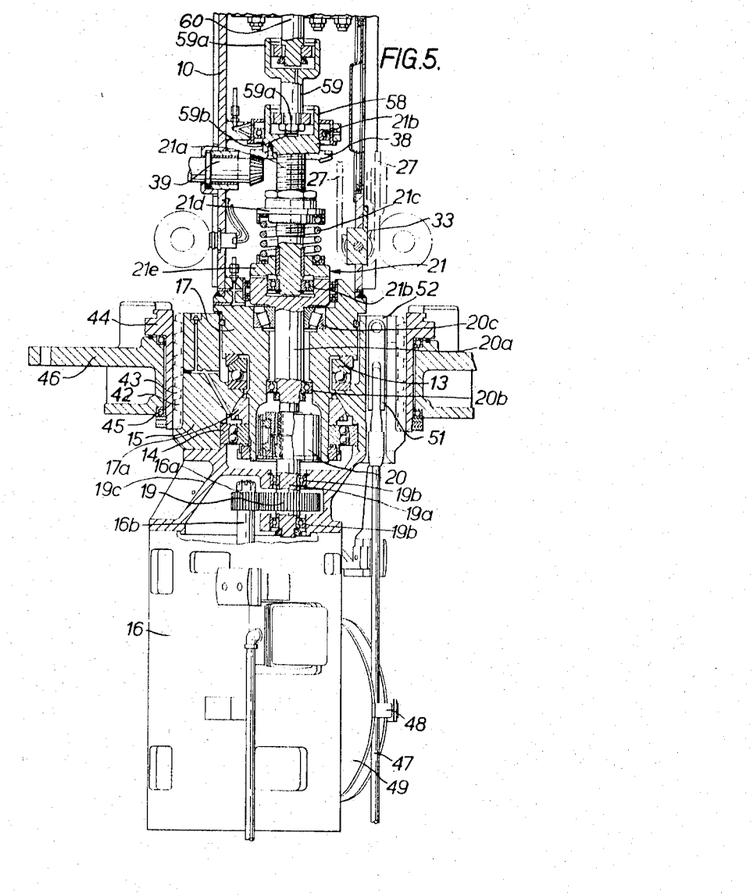
FIGURES 5 to 10 are sectional elevations of portions of the post unit at different vertical levels therein from the bottom to the top of the unit.
Figure 6:
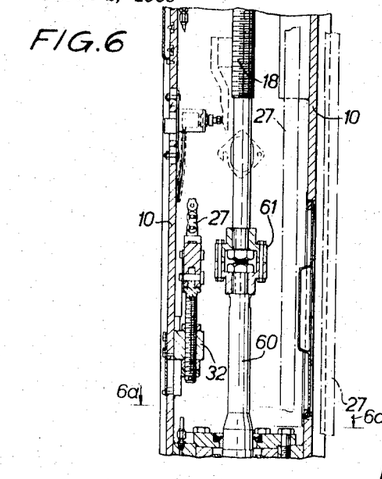
Figure 6A:
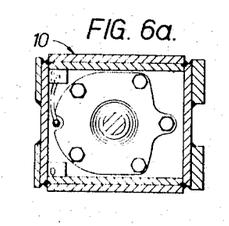
FIGURE 6a is a cross-section showing the square shape of the post.
Figure 7:
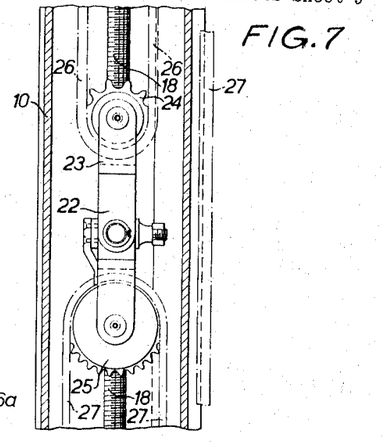
Figure 8:
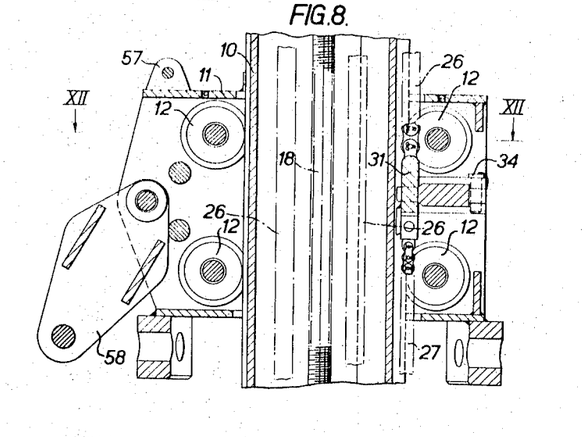
Figure 9:
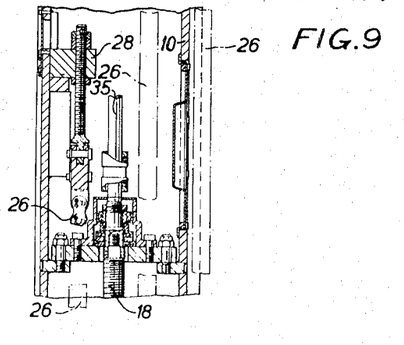
Figure 10:
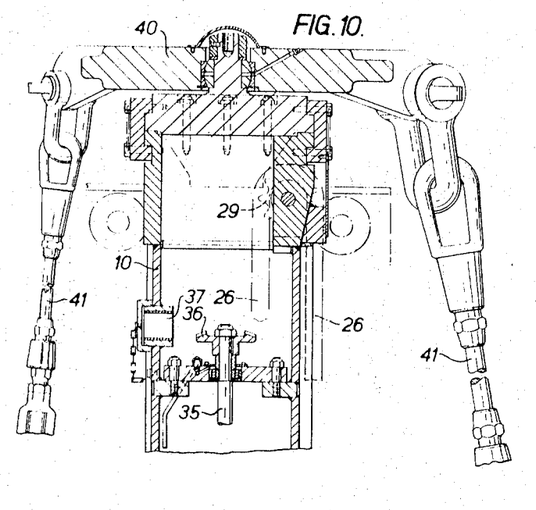
Figure 11:
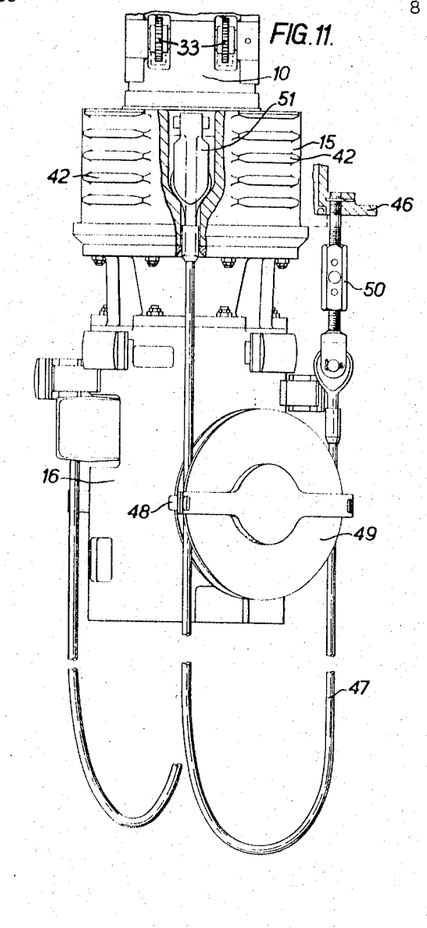
FIGURE 11 is a side elevation of the bottom portion of the post unit as shown in section in and on the same scale as FIGURE 5.
Figure 12:
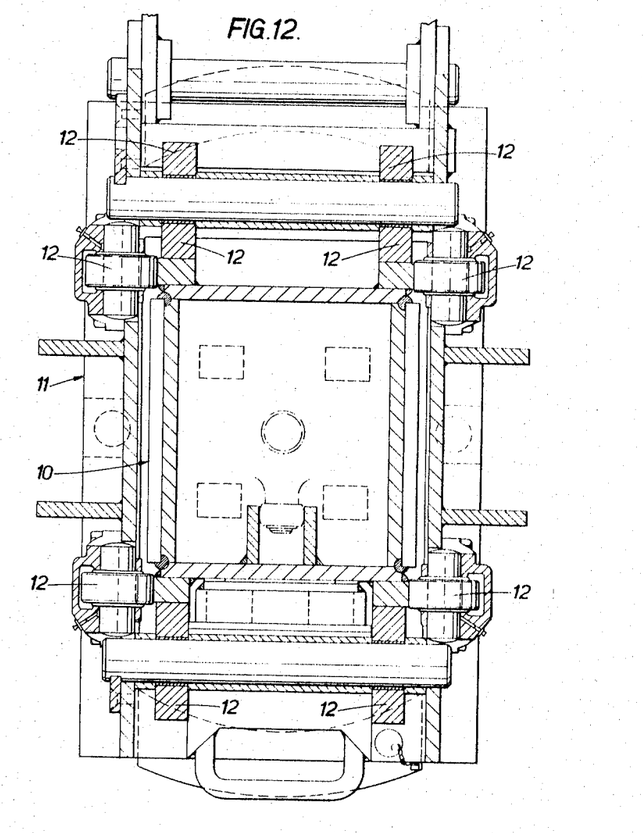
FIGURE 12 is a horizontal section on the line XII—XII of FIGURE 8.

When it is required to retract the king post, the motor is operated to bring the pad eye 11 down to deck level where the carrier 31 is disconnected from it by the quick-release device. The pad eye is then secured to the deck by means of clamp screws 53 mounted on the deck fitting and thus becomes a roller guide for the king post when it moves downwards. The connecting member 51 on the wire rope 47 is removed from the passage 52 and attached to the carrier 31 by means of the quick-release device thereon. The motor is then operated in the "up" direction so as to cause the carrier 31 to rise and take up all the slack in the loop of wire rope. Operation of the motor is continued until the friction clutch 21 slips so as to ensure that the chains and rope are fully supporting the weight of the king post through the pulley 49. The motor is then stopped and the nut 44 is rotated to free the threads thereon from the male threads on the casting 14. The motor is next operated in the "down" direction and the king post descends into the storage trunk. As the stays 41 slacken, they will be released and manipulated by deck personnel until the king post has descended for a sufficient distance to be stabilized by the roller guide constituted by the pad eye. When fully descended as shown in FIGURE 3, the motor casing engages a seating 54 near the bottom of the trunk, the wire rope will slacken and the friction clutch again slips. The motor is stopped and the top of the king post is clamped down by clamping screws 55. Finally a hatch cover 56 is placed over the portion of the mechanism remaining above deck level. Erection of the king post is effected by simply reversing the above sequence of operations.

The pad eye may carry projections on its underside engageable in recesses in the deck fitting 46 and the casting 15 to align the pad eye and king post properly for retracting and to lock the casting to the king post and the deck fitting against rotation when the nut 44 is turned.

Instead of employing a conventional hatch above the deck surface as hereinbefore described, the arrangement may employ a recessed hatch below the deck surface, so that when the cover is fitted after stowing the post, the deck is left entirely unencumbered.

Limit switches may be provided within the king post for controlling the maximum extent of the up and down movements of the pad eye. If necessary, a switch may be provided for over-riding the limit switches when raising and lowering the king post to cause the friction clutch to slip as hereinbefore mentioned. The clutch is preferably such as to give an audible indication (e.g. a clicking noise) when it slips.

The operation of the electric motor is conveniently controlled by a manually operated push button unit 62 which can be stowed beneath the hatch when the king post is retracted and which operates in conjunction with a remote controller 63 below the deck.

The following are typical operational sequences for erecting and lowering the king post shown in the drawings:

*To erect*

(1) Open hatch and lift out the push button station.
(2) Bring stay wires out from deck store.
(3) Release clamp screws securing the post on its seating.
(4) Switch power on at remote controller (push button unit lights up).
(5) Push "UP" button, and post rises out of trunk.
(6) Attach stays to top of post while at convenient height.
(7) Attach other ends of stays to deck fittings.
(8) When fully erected the pre-set and pre-stressed stays will automatically square-up the post without attention. The clutch will make a clicking sound. Release the "UP" button.
(9) Turn the nut to lock the post axially.
(10) Push "DOWN" button. This will bring the pad eye carrier down to deck level leaving the post safely erected.
(11) While this is happening, release clamp screws secured pad eye.
(12) Release "DOWN" button. Disconnect elevating rope from pad eye carrier and drop into recess. Engage carrier with the pad eye.
(13) Plug in lead which connects the limit switch.
(14) The pad eye is now ready to receive the high-line attachment and can be elevated or lowered at will by pressing the appropriate button.

*To retract*

(1) Push "DOWN" button to bring pad eye down to deck.
(2) While descending, pull out limit switch plug.
(3) On reaching deck disconnect high-line attachment and disengage the carrier from the pad eye.
(4) Lift elevating rope fitting from recess and engage with the carrier.
(5) Push "UP" button, to tighten up the elevating rope.
(6) While rope fitting is ascending, secure pad eye to deck by engaging clamp screws.
(7) When elevating rope is fully tightened and therefore supporting the whole weight of the post, the clutch will slip with its rapid clicking.
(8) Release "UP" button and turn the nut to release the post for axial movement.
(9) Push "DOWN" button and the post retracts below deck.
(10) During descent disconnect stay wires from deck fittings and as top of post reaches convenient height, disconnect stays from top as well.
(11) When fully retracted, secure post to seating by clamp screws.
(12) Switch off power at remote controller.
(13) Stow manual push button unit.
(14) Close hatch.
(15) Remove stays to deck store.

In practice, a supply vessel may have a fixed post constructed as hereinbefore described with reference to the drawings but without provision for retraction of the post below deck. A buffer assembly may be permanently attached to the sliding pad eye. Each receiving vessel may be equipped only with a retractable king post and pad eye as hereinbefore described, the buffer assembly for use on the receiving vessel being carried by the supply vessel and loaned to the receiving vessel until the transfer operation is completed.

On keeping a rendezvous, the receiving ship arrives with its king post erected and the pad eye at deck level with a light sheave attached to its secondary connection 57. The supply ship approaches with its pad eye also at deck level. A hand line is thrown to the receiving vessel, with a temporary hauling line attached. The hauling line is brought aboard, and the hand line is reeved through the sheave and thrown back to the supply vessel. The hand line is passed over a winch until the start of the hauling line is brought aboard the supply vessel. The supply vessel then attaches the receiving vessel's buffer assembly (to which the high line or jackstay is fastened) to the temporary hauling line. Both ships raise their pad eyes part way up their king posts and the buffer assembly is winched across to the receiving vessel, where the pad eye is lowered to deck level and the buffer assembly attached to the primary pad eye connection 58. The temporary hauling line is released from the sheave and is winched back to the supply vessel.

With a jackstay now connecting the two ships, transfer of loads can commence. With the pad eyes at deck level, the supply ship attaches a load to the jackstay traveller. Both pad eyes travel up and the traveller is winched across to the receiving ship. On arriving at the receiving end, both pad eyes travel down and the load is released on deck. Both pad eyes travel up and the traveller is winched back to the supply vessel. This cycle is then continued until transfer is completed.

The cycle is basically Up, Across, Down, Up, Return, Down.

Removal and attachment of the load at deck level facilitates control and proper positioning of the load. Since the king post is free to swivel at top and bottom, it can turn either fore or aft to accommodate automatically any change in station alignment between two ships transferring cargo. Additionally, the king post and pad eye can be rotated through 180° should it become necessary to transfer cargo at the other side of the ship or at any other point of the compass.

I claim:

1. A post unit for a high-line transfer system for use in the transfer of material from one sea going vessel to another, said post unit comprising:
   (a) a post,
   (b) a cable attachment member mounted for vertical reciprocation on the post,
   (c) means for adjusting the vertical position of the attachment member on the post comprising a vertical screw, a nut non-rotatably mounted on the screw, and means connecting the nut to the attachment member so that vertical movement of the nut resulting from rotation of the screw causes vertical movement of the attachment member, said connecting means also including guide wheels and flexible connectors and wherein said nut is connected to the attachment member by said flexible connectors passing round said guide wheels, (d) a drive system for said unit, said drive system comprising a motor coupled to the adjusting means.

2. A post unit according to claim 1 wherein said flexible connectors extend respectively upwards and downwards from the attachment member to pass around guide wheels carried by the post and the nut to anchorages fixed to the post, whereby vertical movement of the nut in one direction causes vertical movement of the attachment member in the opposite direction.

3. A post unit according to claim 1, wherein said unit has a base and a support therefor, self-aligning thrust and journal bearings having a common alignment centre through which said base is rotatably mounted on said support.

4. A post unit according to claim 3 wherein the motor is carried by said support and said drive system includes a flexible coupling so disposed that its centre of deflection coincides with said common alignment centre.

5. A post unit according to claim 3 wherein a self-aligning top fitting is provided at the top of the post for attachment of supporting stays.

6. A post unit according to claim 1 wherein means are provided for retracting at least a substantial length of the post below deck level.

7. A post unit according to claim 6 wherein said attachment member is adapted to be secured at deck level and act as a guide through which the post can be retracted downwards.

8. A post unit according to claim 6 wherein said retracting means are adapted to be connected to said drive system.

9. A post unit according to claim 8 wherein said retracting means comprise a supporting member and means for disconnecting said drive system from the attachment member and connecting the system to one end of the supporting member, a supporting wheel carried at the bottom of the post, said supporting member extending downwards from the end connected to the drive system and passing round said supporting wheel and then extending upwards to a fixed anchorage.

10. A post unit according to claim 6, including means for releasably locking the post in its extended position, said means comprising a male breech-type interrupted thread at the bottom of the post, which male thread is engageable with a female breech-type interrupted thread in a member fixed against vertical movement.

References Cited

UNITED STATES PATENTS

| | | | |
|---|---|---|---|
| 81,325 | 8/1868 | Ashcroft et al. | 187—24 |
| 952,673 | 3/1910 | Karr | 104—113 X |
| 1,415,603 | 5/1922 | Mickelson | 187—24 |
| 1,446,774 | 2/1923 | Townsend | 187—24 X |
| 1,986,620 | 1/1935 | Borden | 187—24 |
| 2,137,743 | 11/1938 | Strassman | 254—148 |
| 3,012,518 | 12/1961 | Sawyer et al. | 214—13 X |
| 3,059,590 | 10/1962 | Feiler et al. | 214—13 X |
| 3,224,379 | 12/1965 | Miller | 214—13 X |

FOREIGN PATENTS 920,285  4/1927  France.

FRANK L. ABBOTT, *Primary Examiner.*

PRICE C. FAW, *Examiner.*